United States Patent [19]

Tatsuda et al.

[11] Patent Number: 6,090,862
[45] Date of Patent: Jul. 18, 2000

[54] PROCESS FOR RECYCLING POLYOLEFIN CROSS-LINKED SUBSTANCE OR POLYOLEFIN FOAMED SUBSTANCE

[75] Inventors: Narihito Tatsuda; Kenzo Fukumori; Norio Sato, all of Nagoya; Seiichi Sahara; Hideki Ono, both of Aichi-ken, all of Japan

[73] Assignee: Toyota Jidosha Kabushiki Kaisha, Toyota, Japan

[21] Appl. No.: 08/927,185

[22] Filed: Sep. 11, 1997

[30] Foreign Application Priority Data

Sep. 12, 1996 [JP] Japan .................................... 8-242073

[51] Int. Cl.$^7$ .............................. C08F 11/04; C08F 11/10
[52] U.S. Cl. ................. 521/79; 521/41; 521/42; 521/95; 521/142; 521/144; 521/147
[58] Field of Search ................... 521/79, 41, 42, 521/95, 142, 144, 147

[56] References Cited

U.S. PATENT DOCUMENTS

| | | | |
|---|---|---|---|
| 4,246,211 | 1/1981 | Künel | 264/37 |
| 4,255,372 | 3/1981 | Kuhnel et al. | 264/54 |
| 5,149,774 | 9/1992 | Patel et al. | 521/47 |

FOREIGN PATENT DOCUMENTS

| | | |
|---|---|---|
| 49-98480 | 9/1974 | Japan . |
| 57-8114 | 1/1982 | Japan . |
| 7-502552 | 3/1995 | Japan . |

*Primary Examiner*—James J. Seidleck
*Assistant Examiner*—Olga Asinovsky
*Attorney, Agent, or Firm*—Burns, Doane, Swecker & Mathis, LLP

[57] ABSTRACT

A process is developed for recycling a polyolefin cross-linked substance having a cross-linkage, a polyolefin foamed substance free from a cross-linkage or a polyolefin foamed substance having a cross-linkage. The process includes the step of heating the polyolefin cross-linked substance together with a cross-linkage breaking agent, whereby breaking the cross-linkage to recycle the polyolefin cross-linked substance into a moldable thermoplastic resin. Further, the process includes the step of adding a foaming-agent-decomposition facilitating agent to the polyolefin foamed substance in the course of thermally melting the polyolefin foamed substance, whereby decomposing a residual foaming agent remaining in the polyolefin foamed substance. Furthermore, the process includes the step of adding a foaming-agent-decomposition facilitating agent to the polyolefin foamed substance in the course of heating the polyolefin foamed substance to break the cross-linkage, whereby decomposing a residual foaming agent remaining in the polyolefin foamed substance. The resulting recycled product is improved in terms of moldability, strength, elongation and superficial appearance.

47 Claims, 3 Drawing Sheets

PROCESS FOR RECYCLING POLYOLEFIN CROSS-LINKED SUBSTANCE OR POLYOLEFIN FOAMED SUBSTANCE

BACKGROUND OF THE INVENTION

1. Field of the Invention

The present invention relates to a process for recycling a polyolefin cross-linked substance or a polyolefin foamed substance. In particular, it relates to a process for recycling a multi-layered laminate. The multi-layered laminate includes a layer formed of a polyolefin cross-linked substance or a polyolefin foamed substance, and is utilized as an interior material for making automotive interior component parts, such as an instrument panel, a door trim panel, and so on.

2. Description of the Related Art

Japanese Unexamined Patent Publication (KOKAI) No. 57-8,114, for example, discloses a process for recycling a polyolefin cross-linked substance. In the process, a polyolefin cross-linked substance is independently subjected to an elevated temperature and a high shear force, and is thereby pulverized by heat and shear force. In the process, however, a high shear force is applied to the polyolefin cross-linked substance in an unmelting state. Accordingly, the molecular chains of the polyolefin cross-linked substance are cleaved randomly. As a result, the process suffers from a drawback in that the resulting recycled product is deteriorated considerably in terms of physical properties.

Moreover, Japanese-National-Law Laid-Open Patent Publication No. 7-502,552 discloses a reaction for forcibly cleaving the molecular chains of a cross-linked substance. In the process, a cross-linked substance is brought into contact with an ozone flow in a special halogen solvent to compulsorily cleave the molecular chains. In the process, however, the molecular chains of the cross-linked substance are cleaved randomly. Consequently, the process likewise exhibits a disadvantage in that the physical properties of the resulting recycled product are degraded sharply.

SUMMARY OF THE INVENTION

The present invention has been developed while aiming at producing a high-quality recycled product from a polyolefin cross-linked substance or a polyolefin foamed substance. It is therefore an object of the present invention to establish a process for recycling a polyolefin cross-linked substance or a polyolefin foamed substance. The resulting high-quality recycled product can be utilized in the same applications as the polyolefin cross-linked substance or the polyolefin foamed substance which has been utilized prior to the recycling process. In addition, the resulting high-quality recycled product can be utilized in other applications which make the best use of the special characteristics of the high-quality recycled product.

A first aspect of the present invention is a process for recycling a polyolefin cross-linked substance having a cross-linkage. The process comprises the step of:

heating a polyolefin cross-linked substance having a cross-linkage together with a cross-linkage breaking agent, whereby breaking the cross-linkage to recycle the polyolefin cross-linked substance into a moldable thermoplastic resin.

A second aspect of the present invention is a process for recycling a polyolefin foamed substance free from a cross-linkage. The process comprises the step of:

adding a foaming-agent-decomposition facilitating agent to a polyolefin foamed substance in the course of thermally melting the polyolefin foamed substance, whereby decomposing a residual foaming agent remaining in the polyolefin foamed substance.

A third aspect of the present invention is a process for recycling a polyolefin foamed substance having a cross-linkage. The process comprises the step of:

adding a foaming-agent-decomposition facilitating agent to a polyolefin foamed substance in the course of heating the polyolefin foamed substance to break the cross-linkage, whereby decomposing a residual foaming agent remaining in the polyolefin foamed substance.

A fourth aspect of the present invention is a process for recycling a laminate, which includes a first layer formed of a polyolefin cross-linked substance with a cross-linkage and a second layer formed of a thermoplastic resin, the cross-linkage including at least one bond selected from the group consisting of an ester bond, an amide bond, a urea bond, a urethane bond, an ether bond and a sulfone bond. The process comprises the steps of:

thermally melting the second layer while heating the laminate together with a cross-linkage breaking agent, whereby breaking the cross-linkage of the polyolefin cross-linked substance and obtaining a mixture; and kneading the obtained mixture, whereby recycling the laminate into a thermoplastic resinous material conforming to the second layer of the laminate.

A fifth aspect of the present invention is a process for recycling a laminate, which includes a first layer formed of a polyolefin foamed substance free from a cross-linkage, and a second layer formed of a thermoplastic resin. The process comprises the steps of:

thermally melting the second layer while adding a foaming-agent-decomposition facilitating agent to the laminate in the course of thermally melting the first layer, whereby decomposing a residual foaming agent remaining in the first layer and obtaining a mixture; and kneading the obtained mixture, whereby recycling the laminate into a thermoplastic resinous material conforming to the second layer of the laminate.

A sixth aspect of the present invention is a process for recycling a laminate, which includes a first layer formed of a polyolefin foamed substance with a cross-linkage, and a second layer formed of a thermoplastic resin, the process comprising the steps of:

thermally melting the second layer while adding a foaming-agent-decomposition facilitating agent to the laminate in the course of heating the first layer to break the cross-linkage of the polyolefin foamed substance, whereby decomposing a residual foaming agent remaining in the first layer and obtaining a mixture; and kneading the obtained mixture, whereby recycling the laminate into a thermoplastic resinous material conforming to the second layer of the laminate.

In accordance with the first, third, fourth and sixth aspects of the present invention, it is possible to break the cross-linkage of the polyolefin cross-linked substance, and to thermally melt the polyolefin cross-linked substance whose cross-linkage is broken. Thus, it is possible to re-mold the polyolefin cross-linked substance whose cross-linkage is broken in the same manner as ordinary thermoplastic resins are molded. Moreover, it is possible to melt and knead the polyolefin cross-linked substance whose cross-linkage is broken with other resins. As a result, the resulting recycled product is improved in terms of moldability, strength, elongation, etc., compared with those of the recycled products which are produced by the conventional simple recycling processes free from the cross-linkage breakage.

Moreover, in accordance with the second and fifth aspects of the present invention, it is possible to decompose the residual foaming agent remaining in the polyolefin foamed substance, and to reduce the content of the residual foaming agent remaining in the resultant recycled product. Thus, it is possible to inhibit the recycled product from being foamed by the residual foaming substance when re-molding the recycled product. As a result, it is possible to upgrade the resulting recycled product in terms of superficial appearance.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
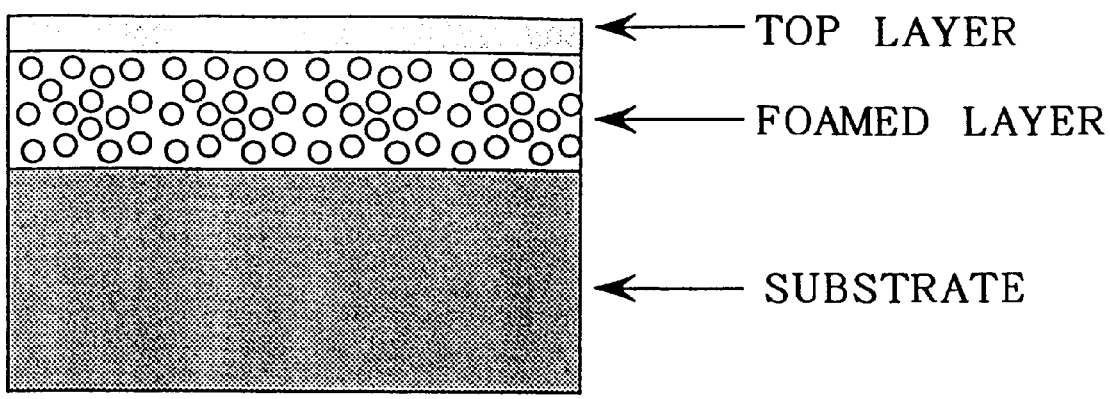
FIG. 1 illustrates a schematic cross-sectional view of a multi-layered laminate for making automobile interior component parts.

Having generally described the present invention, a further understanding can be obtained by reference to the specific preferred embodiments which are provided herein for the purpose of illustration only and not intended to limit the scope of the appended claims.

The present invention relates to a process for recycling a polyolefin cross-linked substance, a polyolefin foamed substance, or a laminate which includes a layer formed of a polyolefin cross-linked substance or a polyolefin foamed substance, and a thermoplastic resin layer.

In the present polyolefin cross-linked substance recycling process, the polyolefin cross-linked substance can preferably be formed of a polypropylene. In the present polyolefin foamed substance recycling process, the polyolefin foamed substance can preferably be formed of polypropylene. In the present laminate recycling process, the resultant recycled product can be used as a thermoplastic resinous material for forming a thermoplastic resin layer of the laminate.

In the present recycling process, the term, "polyolefin cross-linked substance", means a material which includes main chains formed of polyolefin skeletons, and a cross-linkage connecting the main chains with each other.

The term, "cross-linking bond", means part of molecular bonds included in the cross-linkage, molecular bonds which can be broken by the later described cross-linkage breaking agent.

In general, it is possible to exemplify an ester bond, an amide bond, a urea bond, a urethane bond, an ether bond, an acetal bond and a sulfone bond as the cross-linking bond.

Among the aforementioned bonds, the ester bond, the amide bond, and the urea bond can preferably be included in the cross-linkage as the cross-linking bond, because they can be broken by many cross-linkage breaking agents, such as water, alcohol, amine, acid, alkali, Lewis acid and alkoxide. In particular, the ester bond can especially preferably be included in the cross-linkage because it requires a smaller activation energy for breaking compared with the other cross-linking bonds.

The present recycling process is applicable to substances formed of a polyolefin resin. A polyolefin resin is a polymer which is prepared by polymerizing one or more olefin molecules. For example, in the present recycling process, the polyolefin resin can be a polyethylene resin or a polypropylene resin. In addition, the polyolefin resin can further include an elastomer, such as an ethylene-propylene copolymer and an ethylene-butene copolymer. Moreover, the present recycling process can be applied to a polymer blend in which some of the aforementioned component members are mixed, or a copolymer which is prepared by copolymerizing some of the aforementioned component members.

The term, "polyolefin cross-linked substance" means a polyolefin resin which has been subjected to a cross-linking treatment. The polyolefin cross-linked substance can be prepared in the following manner. For instance, a polypropylene is mixed with a compound (or a cross-linking facilitating agent) which includes a plurality of vinyl groups and at least one of the aforementioned cross-linking bonds included in the cross-linkage. The mixture is molded to a sheet. The resulting sheet is turned into a polyolefin cross-linked substance by electron-beam cross-linking. In this instance, the vinyl groups and the polypropylene main chains are bonded by radical reaction. Accordingly, it is possible to form a polyolefin cross-linked substance which includes the cross-linking bonds in the cross-linkage only.

The cross-linkage breaking agent is a compound which reacts chemically and selectively with the cross-linking bonds to break the cross-linking bonds. For example, when the cross-linking bond is the ester bond, the amide bond, the urea bond or the urethane bond, at least one member selected from the group consisting of water, alcohol, amine, acid, alkali, Lewis acid and alkoxide can be used as the cross-linkage breaking agent. When the cross-linking bond is the ether bond, the acetal bond and the sulfone bond, acid can preferably be used as the cross-linkage breaking agent.

When the alcohol is used as the cross-linkage breaking agent, the alcohol can be a monohydric alcohol or a polyhydric alcohol. The monohydric alcohol can be at least one member selected from the group consisting of methanol, ethanol, propanol, iso-propanol, n-butyl alchol, iso-butyl alcohol, sec-butyl alcohol, tert-butyl alcohol, methylcellosolve, ethylcellosolve and 1-methoxy-2-propanol. The polyhydric alcohol can be at least one member selected from the group consisting of ethylene glycol and glycerin. Among the aforementioned alcohols, the ethylene glycol is especially preferred because it includes the hydroxy groups in a high content.

When the amine is used as the cross-linking bond breaking agent, the amine can be a primary amine, a secondary amine, an alcoholic amine or a polyatomic amine. The primary amine can be at least one member selected from the group consisting of methylamine, ethylamine, n-propylamine, iso-propylamine, n-butylamine, iso-butylamine, sec-butylamine, tert-butylamine, ethylenediamine, propylenediamine, butylenediamine, dimethylaminopropylenediamine and 2-ethoxyethylamine. The secondary amine can be at least one member selected from the group consisting of dimethylamine, diethylamine, dimethylaminopropylenediamine and diethylenetriamine. The alcoholic amine can be at least one member selected from the group consisting of ethanol amine and propanol amine. The polyatomic amine can be at least one member selected from the group consisting of ethylenediamine, propylenediamine, butylenediamine, dimethylaminopropylenediamine and diethylenetriamine. Among the aforementioned amines, the ethylenediamine is especially preferred because it effects a high cross-linkage breaking ability.

When the acid is used as the cross-linkage breaking agent, the acids can be an inorganic acid or an organic acid. The inorganic acid can be at least one member selected from the group consisting of hydrochloric acid, sulfuric acid and nitric acid. The organic acid can be at least one member selected form the group consisting of carboxylic acid and toluenesulfonic acid. The carboxylic acid can be at least one member selected from the group consisting of acetic acid and lactic acid.

When the alkali is used as the cross-linkage breaking agent, the alkali can be an inorganic alkali or an organic base. The inorganic alkali can be at least one member selected from the group consisting of sodium hydroxide and potassium hydroxide. The organic base can be at least one member selected from the consisting of tetramethylammonium hydroxide and tetraethylammonium hydroxide.

When the Lewis acid is used as the cross-linkage breaking agent, the Lewis acid can be chloride or carboxylate salt. The chloride can be aluminum chloride. The carboxylate salt can be at least one member selected from the group consisting of stearate and acetate. Among the aforementioned Lewis acid, the aluminum chloride is especially preferred because it exhibits a high cross-linkage breaking ability.

When the organic salt is used as the cross-linkage breaking agent, the organic salt can be tin organic salt. The tin organic salt can be at least one member selected from the group consisting of dibutyltin dilaurate, dibutyltin dimaleate and tributyltin chloride.

When the alkoxide is used as the cross-linkage breaking agent, the alkoxide can be an alkaline-metallic alkoxide, an alkali-earth-metallic alkoxide or a metallic alkoxide. The alkaline-metallic alkoxide can be sodium ethylate, sodium methoxide, potassium methoxide, potassium ethoxide and potassium butoxide. The alkali-earth-metallic alkoxide can be magnesium ethoxide and magnesium iso-propoxide. The metallic alkoxide can be aluminum ethoxide, aluminum iso-propoxide, tatanium 2-ethyl-1-hexanolate, titanium tetraisopropoxide, tatanium tetrabutoxide, tetraethoxysilane and tetramethoxysilane. Among the aforementioned alkoxides, sodium ethylate, sodium methoxide, tatanium tetraisopropoxide and titanium tetrabutoxide are especially preferred because they effect a high cross-linkage breaking ability.

Concerning the process for breaking the cross-linkage, the cross-linkage can be broken by heating the polyolefin cross-linked substance while bringing the cross-linkage breaking agent into contact with the polyolefin cross-linked substance. In this operation, it is possible to additionally carry out a process, such as a kneading process, which can apply a shear force to the polyolefin cross-linked substance. In this instance, it is necessary to add a polyolefin resin to the molten mixture in order to give extra thermoplasticity thereto. The polyolefin resin to be added includes the same polyolefin as included in the polyolefin cross-linked substance, and is free from the cross-linkage. As a result, it is possible to reduce the shear force applied to the polyolefin cross-linked substance so that the molecular chains, included in the polyolefin cross-linked substance, can be inhibited from being broken randomly by the shear force.

As the process for breaking the cross-linkage, it is possible to employ the following processes:

1) heating the polyolefin cross-linked substance while bringing a liquid of the cross-linkage breaking agent into contact with the polyolefin cross-linked substance. In particular, it is especially preferred to break the cross-linkage under heat and pressure while pressurizing the polyolefin cross-linked substance in a pressure-resistant container, such as an autoclave;

2) heating the polyolefin cross-linked substance while bringing a vapor of the cross-linkage breaking agent into contact with the polyolefin cross-linked substance; and 3) adding a polyolefin resin, which includes the same polyolefin as included in the polyolefin cross-linked substance and is free from a cross-linkage, to the polyolefin cross-linked substance, and melting and kneading the mixture in the presence of the cross-linkage breaking agent. In this process, in order to inhibit the molecular chains of the polyolefin cross-linked substance form being broken randomly, it is preferred to add the polyolefin resin, which gives fluidity to the mixture to be recycled and is free from the cross-linkage, in an amount of 10% by weight or more, further preferably from 30 to 90% by weight, furthermore preferably from 50 to 80% by weight, with respect to the mixture taken as 100% by weight.

The above-described cross-linkage breaking processes produce a recycled polyolefin resin. Concerning a process for reusing the resultant recycled polyolefin resin, it is possible to re-prepare a polyolefin cross-linked substance by the same process as the conventional process for preparing an ordinary polyolefin cross-linked substance. For example, a divinyl compound can be added to the resultant recycled polyolefin rein. The resulting mixture can be extruded to a sheet. The thus prepared sheet can be turned into a polyolefin cross-linked substance by electron-beam cross-linking.

In the present recycling process, the term, "polyolefin foamed substance", means a material which is foamed chemically by adding an organic foaming agent to a polyolefin and thereafter heating the mixture.

The foaming-agent-decomposition facilitating agent is a compound which reacts chemically and selectively with the foaming agents described later to facilitate the decomposition of the foaming agents. For example, it is possible to use a metallic salt of a fatty acid, a metallic oxide, an alcohol, an amine or an organic salt as the foaming-agent-decomposition facilitating agent.

When the metallic salt of a fatty acid is used as the foaming-agent-decomposition facilitating agent, the metallic salt of fatty acid can be at least one member selected from the group consisting of a stearate and an acetate. The stearate can be at least one member selected from the group consisting of zinc stearate, cadmium stearate, barium stearate and calcium stearate. The acetate can be at least one member selected from the group consisting of zinc acetate, calcium acetate and barium acetate. Among the aforementioned acetates, the zinc acetate is especially preferred because it exhibits a high decomposition ability against the foaming agents.

When the metallic oxide is used as the foaming-agent-decomposition facilitating agent, the metallic oxide can be at least one member selected from the group consisting of a lead oxide, a cadmium oxide, a zinc oxide, a calcium oxide and a magnesium oxide. Among the metallic oxides, the zinc oxide is especially preferred because it exhibits a high decomposition ability against the foaming agents.

When the alcohol or amine is used as the foaming-agent-decomposition facilitating agent, the alcohol or amine can be the above-described alcohols or amines which are utilized as the cross-linkage breaking agent.

When the organic salt is used as the foaming-agent-decomposition facilitating agent, the organic salt can be a tin organic salt. The tin organic salt can be at least one member selected from the group consisting of dibutyltin dilaurate, dibutyltin dimaleate and tributyltin chloride. Among the tin organic salts, the dibutyltin dimaleate is especially preferred because it exhibits a high decomposition ability against the foaming agents.

In the present recycling process, the residual foaming agent includes an unreacted and excessive foaming agent, which remains in the polyolefin foamed substance after the polyolefin foamed substance is prepared by expansion molding, and foamed residuals which result from the expansion molding.

It is possible to employ an organic foaming agent as the foaming agent. The organic foaming agent can be at least one member selected from the group consisting of azodicarbonamide, dinitro pentamethylene tetramine and p,p'-oxybisbenzensulfonylhydrazide.

Concerning the process for decomposing the residual foaming agent, the residual foaming agent can be decomposed by heating the polyolefin foamed substance while bringing the foaming-agent-decomposition facilitating agent into contact with the polyolefin foamed substance. Specifically, it is preferred to decompose the residual foaming agent by one of the following processes:

1) heating the polyolefin foamed substance while bringing a liquid of the foaming-agent-decomposition facilitating agent into contact with the polyolefin foamed substance. In particular, it is especially preferred to decompose the residual foaming agent under heat and pressure while pressurizing the polyolefin foamed substance in a pressure-resistant container, such as an autoclave;
2) heating the polyolefin foamed substance while bringing a vapor of the foaming-agent-decomposition facilitating agent into contact with the polyolefin foamed substance; and
3) melting and kneading the polyolefin foamed substance in the presence of the foaming-agent-decomposition facilitating agent. When the polyolefin foamed substance is a cross-linked polyolefin foamed substance, it is preferred to add a polyolefin resin in order to inhibit the molecular chains of the polyolefin foamed substance from being broken randomly. The polyolefin to be added gives fluidity to the mixture of the cross-linked polyolefin foamed substance and the polyolefin resin to be recycled, can be melted, and is free from a cross-linkage. Note that the meltable and cross-linkage-free polyolefin resin can preferably be added in an amount of 10% by weight or more, further preferably from 30 to 90% by weight, furthermore preferably from 50 to 80% by weight, with respect to the mixture taken as 100% by weight.

Moreover, after the process for decomposing the residual foaming agent, it is furthermore preferred to carry out a degassing operation. If such is the case, the residual foaming agent and the decomposition products stemming therefrom are evaporated and removed facilitatively so that the content of the residual foaming agent can be furthermore reduced.

The above-described residual-foaming-agent decomposing processes produce a recycled polyolefin resin. Concerning a process for reusing the resultant recycled polyolefin resin, it is possible to re-prepare a polyolefin foamed substance by the same process as the conventional process for preparing an ordinary polyolefin foamed substance. For example, azodicarbonamide can be added to the resultant recycled polyolefin rein. The resulting mixture can be extruded at 230° C. to complete a polyolefin foamed substance.

Among the polyolefin laminates, for instance, the laminates, which are employed as interior materials for making automotive interior component parts, include a polyolefin cross-linked substance layer or a polyolefin foamed substance layer (later described) which is utilized as a cushion layer.

In the polyolefin laminate to be recycled by the present recycling process, the term, "polyolefin cross-linked substance layer", means a layer which is formed of a polyolefin cross-linked substance.

In the polyolefin laminate to be recycled by the present recycling process, the term, "polyolefin foamed substance layer", means a layer which is formed of a polyolefin foamed substance.

In the polyolefin laminate to be recycled by the present recycling process, the term, "thermoplastic resin layer", means a layer which is applied to a polyolefin cross-linked substance layer or a polyolefin foamed substance layer, and which is formed of a thermoplastic resin. For example, in the laminates employed as interior materials for making automotive interior component parts, the thermoplastic resin layer is utilized as a top layer or a substrate layer.

In the present invention, the term, "laminate", means an article which includes two or more layers applied to each other. For instance, in the laminates employed as interior materials for making automotive interior component parts, the laminates include a cushion layer, and a top layer. The cushion layer and the top layer are applied to each other. The cushion layer can be formed of a polyolefin foamed substance layer. The top layer can be formed of a thermoplastic resin layer.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

A polypropylene cross-linked substance was prepared in the following manner. A polypropylene resin was mixed with an allyl acrylate. The resultant mixture included 10% by weight of an allyl acrylate, and a balance of a polypropylene resin. The polypropylene resin exhibited a melt index of 3.0 g/10 min. The allyl acrylate worked as a cross-linking facilitating agent. The mixture was kneaded to prepare a sheet having a thickness of 1.0 mm. The resulting sheet was subjected to an ionizing radiation having an intensity of 12 Mrad. A polypropylene cross-linked substance was thus prepared.

120 g of the polypropylene cross-linked substance, and each 500 g of the following cross-linkage breaking agents were sealed in a pressure-resistant container having a volume of 1 liter. The temperature inside the pressure-resistant container was elevated to 150° C. to heat and pressurize the contents thereof for 3 hours. Alternatively, the temperature inside the pressure-resistant container was elevated to 190° C. to heat and pressurize the contents thereof for 5 hours.

In Example Nos. 1 and 5, 1-methoxy-2-propanol was employed as the cross-linkage breaking agent. In Example Nos. 2 and 6, ethylenediamine was employed as the cross-linkage breaking agent. In Example Nos. 3 and 7, ethylene glycol was employed as the cross-linkage breaking agent. In Example Nos. 4 and 8, water was employed as the cross-linkage breaking agent.

As set forth in Table 1 (bis) below, the following were tested as comparative examples. In Comparative Example Nos. 9 and 11, dodecane was employed instead of the cross-linkage breaking agents. In Comparative Example Nos. 10 and 12, no cross-linkage breaking agent was added.

Further, note that, in Comparative Example Nos. 13 and 14, a mixture of a polypropylene resin, which was free from a cross-linkage, and a cross-linkage breaking agent was tested in order to examine how the cross-linkage breaking agent affected the main chains of the cross-linkage-free polyolefin resin. The polyolefin resin exhibited a melt index of 3.0 g/10 min. In Comparative Example Nos. 13 and 14, 1-methoxy-2-propanol was employed as the cross-linkage breaking agent.

Furthermore, in Comparative Example No. 15, a polyolefin resin, which was free from a cross-linkage, was not subjected to the heating-and-pressurizing treatments, but was examined for the solubility in a solvent for polypropylene resin, and for the thermally-melting ability. Table 1 (bis) summarizes the results of the examinations.

Each of the resultant recycled samples was examined for the solubility in a solvent for polypropylene resin, and for the thermally-melting ability. The solvent was ortho-dichlorobenzene (hereinafter simply referred to as "ODCB"). Table 1 and Table 1 (bis) summarize the results of the examinations.

Moreover, each of Comparative Example Nos. 13, 14 and 15, which were prepared out of the cross-linkage-free polypropylene resin, was further measured for the melt index before and after the heating-and-pressurizing treatments. Table 2 below summarizes the results of the measurements.

In addition, each of Example Nos. 1 through 8, and each of Comparative Example Nos. 9 through 15 was examined for the gel fraction after the heating-and-pressurizing treatments. Table 3 and Table 3 (bis) below summarize the results of the examinations.

TABLE 1

| | Identification | Heating-and-Pressurizing Treatment | Test Specimen | Cross-Linkage Breaking Agent | Solubility in ODCB* | Thermally-Melting Ability |
|---|---|---|---|---|---|---|
| 1st Pref. Embodiment | Ex. No. 1 | 150° C. for 3 hours | Cross-linked Polypropylene | 1-methoxy-2-propanol | Soluble | Thermally Meltable |
| | Ex. No. 2 | 150° C. for 3 hours | Cross-linked Polypropylene | Ethylene-diamine | Soluble | Thermally Meltable |
| | Ex. No. 3 | 150° C. for 3 hours | Cross-linked Polypropylene | Ethylene glycol | Soluble | Thermally Meltable |
| | Ex. No. 4 | 150° C. for 3 hours | Cross-liked Polypropylene | Water | Partially Soluble | Not Thermally Meltable |
| 1st Pref. Embodiment | Ex. No. 5 | 190° C. for 5 hours | Cross-linked Polypropylene | 1-methoxy-2-propanol | Soluble | Thermally Meltable |
| | Ex. No. 6 | 190° C. for 5 hours | Cross-linked Polypropylene | Ethylene-diamine | Soluble | Thermally Meltable |
| | Ex. No. 7 | 190° C. for 5 hours | Cross-linked Polypropylene | Ethylene glycol | Soluble | Thermally Meltable |
| | Ex. No. 8 | 190° C. for 5 hours | Cross-linked Polypropylene | Water | Soluble | Thermally Meltable |
| Comp. Ex. | Comp. Ex. No. 9 | 150° C. for 3 hours | Cross-linked Polypropylene | Dodecane | Swollen | Not Thermally Meltable |
| | Comp. Ex. No. 10 | 150° C. for 3 hours | Cross-linked Polypropylene | None | Swollen | Not Thermally Meltable |
| Comp. Ex. | Comp. Ex. No. 11 | 190° C. for 5 hours | Cross-linked Polypropylene | Dodecane | Swollen | Not Thermally Meltable |
| | Comp. Ex. No. 12 | 190° C. for 5 hours | Polypropylene Polypropylene | None | Swollen | Not Thermally Meltable |
| Comp. Ex. | Comp. Ex. No. 13 | 150° C. for 3 hours | PP free from Cross-Linkage | 1-methoxy-2-propanol | Soluble | Thermally Meltable |
| | Comp. Ex. No. 14 | 190° C. for 5 hours | PP free from Cross-Linkage | 1-methoxy-2-propanol | Soluble | Thermally Meltable |
| | Comp. Ex. No. 15 | None (w/o recycling) | PP free from Cross-Linkage | None | Soluble | Thermally Meltable |

(Note) *"ODCB" stands for ortho-dichlorobenzene.

TABLE 2

| | Identification | Heating-and-Pressurizing Treatment | Test Specimen | Cross-Linkage Breaking Agent | Melt Index* (g/10-min.) |
|---|---|---|---|---|---|
| Comp. Ex. | Comp. Ex. No. 13 | 150° C. for 3 hours | PP free from Cross-Linkage | 1-methoxy-2-propanol | 3.0 |
| | Comp. Ex. No. 14 | 190° C. for 5 hours | PP free from Cross-Linkage | 1-methoxy-2-propanol | 2.9 |
| | Comp. Ex. No. 15 | None (w/o recycling) | PP free from Cross-Linkage | None | 3.0 |

(Note)
*The melt index was measured in accordance with ASTM D1238.

TABLE 3

| | Identification | Heating-and-Pressurizing Treatments | Test Specimen | Cross-Linkage Breaking Agent | Gel Fraction (%) |
|---|---|---|---|---|---|
| 1st Pref. Embodiment | Ex. No. 1 | 150° C. for 3 hours | Cross-linked Polypropylene | 1-methoxy 2-propanol | 0 |
| | Ex. No. 2 | 150° C. for 3 hours | Cross-linked Polypropylene | Ethylene diamine | 0 |
| | Ex. No. 3 | 150° C. for 3 hours | Cross-linked Polypropylene | Ethylene glycol | 0 |
| | Ex. No. 4 | 150° C. for 3 hours | Cross-linked Polypropylene | Water | 45 |
| 1st Pref. Embodiment | Ex. No. 5 | 190° C. for 5 hours | Cross-linked Polypropylene | 1-methoxy-2-propanol | 0 |
| | Ex. No. 6 | 190° C. for 5 hours | Cross-linked Polypropylene | Ethylene-diamine | 0 |
| | Ex. No. 7 | 190° C. for 5 hours | Cross-linked Polypropylene | Ethylene glycol | 0 |
| | Ex. No. 8 | 190° C. for 5 hours | Cross-linked Polypropylene | Water | 0 |
| Comp. Ex. | Comp. Ex. No. 9 | 150° C. for 3 hours | Cross-linked Polypropylene | Dodecane | 84 |
| | Comp. Ex. No. 10 | 150° C. for 3 hours | Cross-linked Polypropylene | None | 85 |
| Comp. Ex. | Comp. Ex. No. 11 | 190° C. for 5 hours | Cross-linked Polypropylene | Dodecane | 85 |
| | Comp. Ex. No. 12 | 190° C. for 5 hours | Cross-linked Polypropylene | None | 83 |
| Comp. Ex. | Comp. Ex. No. 13 | 150° C. for 3 hours | PP free from Cross-Linkage | 1-methoxy-2-propanol | 0 |
| | Comp. Ex. No. 14 | 190° C. for 5 hours | PP free from Cross-Linkage | 1-methoxy-2-propanol | 0 |
| | Comp. Ex. No. 15 | None (w/o recycling) | PP free from Cross-Linkage | None | 0 |

The solubility of the recycled samples in the solvent was evaluated in the following manner. After the heating-and-pressurizing treatments, each 0.1 g of the recycled samples was put into 100 milliliters of ODCB. Then, the resultant mixtures were heated at 150° C. for 3 hours to evaluate the solubility of the recycled samples. After the solubility examinations, each of the resulting solutions was filtered to measure the gel fraction in each of the resinous residues.

Further, the thermally-melting ability of the recycled samples was evaluated as follows. After the heating-and-pressurizing treatments, each 50 g of the recycled samples was charged in a single-axis extruder, and was extruded at 230° C. to check whether a strand-like product could be prepared.

Furthermore, the melt index of the recycled samples was measured in accordance with ASTM (i.e., American Society for Testing and Materials) D1238.

As can be understood from Table 1 (bis), when the polypropylene resin was free from a cross-linkage, for instance, not only Comparative Example No. 15, which was not subjected to the heating-and-pressurizing treatments, but also Comparative Examples Nos. 13 and 14, whose cross-linkage was cleaved by the cross-linkage breaking agent (e.g., 1-methoxy-2-propanol), were soluble in the solvent (e.g., ODCB), and they were thermally meltable. In addition, as can be appreciated from Table 2, Comparative Example Nos. 13 and 14 exhibited the melt index which did not vary virtually before and after the heating-and-pressurizing treatments. Hence, it was verified that the main chains of the polypropylene resin were little cleaved under the conditions of the heating-and-pressurizing treatments.

As can be further understood from Table 1 (bis), when the recycled samples were prepared out of the polypropylene cross-linked substance, for example, Comparative Example Nos. 10 and 12, which were subjected to the heating-and-pressurizing treatments without the cross-linkage breaking agents, were swollen by the solvent (e.g., ODCB), but were not soluble in the solvent. Further, Comparative Example Nos. 10 and 12 were not thermally meltable. Furthermore, as can be appreciated from Table 3 (bis), even when the polypropylene cross-linked substance was heated and pressurized under the different conditions (e.g., 150° C. for 3 hours in Comparative Example Nos. 9 and 10, and 190° C. for 5 hours in Comparative Example Nos. 11 and 12), the resultant recycled samples showed the gel fraction which did not vary substantially. Therefore, it was found that, when the cross-linkage was present, the resultant recycled samples did not dissolve in ODCB, nor melt thermally even if they were made from polypropylene.

On the other hand, as can be appreciated from Table 1, when the polypropylene cross-linked substance was recycled with the cross-linkage breaking agents, for example, 1-methoxy-2-propanol in Example Nos. 1 and 5, ethylenediamine in Example Nos. 2 and 6 and ethylene glycol in Example Nos. 3 and 7, at 150° C. for 3 hours or at 190° C. for 5 hours, the resultant recycled samples were soluble in the solvent (e.g., ODCB). Further, the recycled samples exhibited a gel fraction of 0%: namely; they were free from gel. Furthermore, the recycled samples were thermally meltable. Since the main chains of polypropylene were not cleaved during the cross-linkage breaking as described earlier, it was assumed that the cross-linking bonds, included in the cross-linkage of the polypropylene cross-linked substance, were cleaved.

Figure 2:
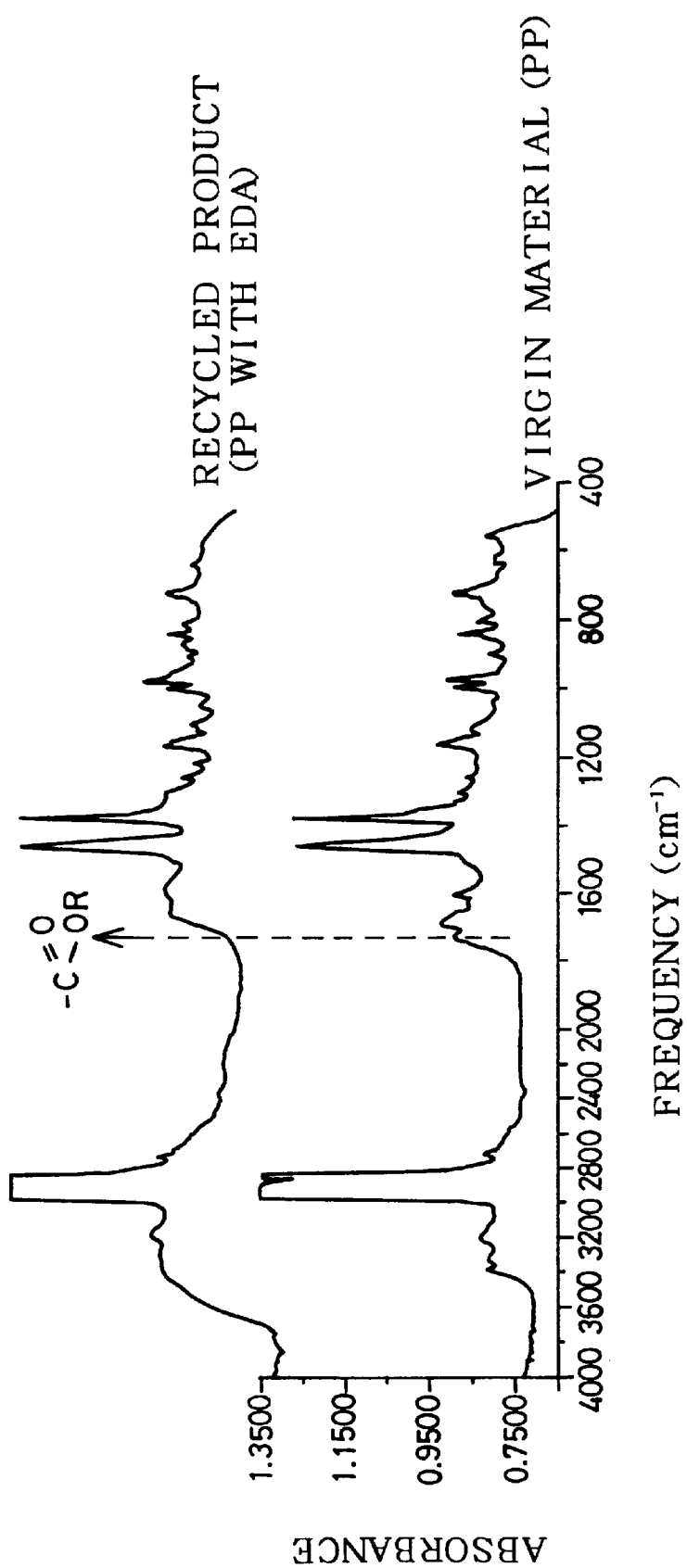
FIG. 2 illustrates infrared spectra on a polyolefin cross-linked substance before and after the polyolefin cross-linked substance was subjected to a cross-linkage breakage which was carried out by using ethylenediamine in a First Preferred Embodiment according to the present invention.

FIG. 2 shows infrared spectra on a polyolefin cross-linked substance before and after the polyolefin cross-linked substance was subjected to the above-described cross-linkage breaking. The polyolefin cross-linked substance was heated and pressurized with ethylenediamine. As can be seen from FIG. 2, the polyolefin cross-linked substance showed a peak at around 1730 $cm^{-1}$, which resulted from an ester bond (i.e., a cross-linking bond), before the cross-linkage breaking. On the contrary, the peak, which resulted from an ester bond, disappeared after the polyolefin cross-linked substance was subjected to the cross-linkage breaking. As aforementioned, it was justified that the main chains of polypropylene were not cleaved during the cross-linkage breaking which was carried out under the above-described temperature conditions. Therefore, it was understood that only the ester bonds, included in the cross-linkage of the polypropylene cross-linked substance, were cleaved selectively.

In particular, as recited in Table 1, when the polyolefin cross-linked substance was heated and pressurized with water at 150° C. for 3 hours, the resultant recycled samples (i.e., Example No. 4) did not solve in ODCB completely. However, as set forth in Table 3, the recycled samples exhibited a gel fraction which was reduced to 45%. Hence, it was verified that the cross-linkage breaking occurred under these conditions, but insufficiently. Moreover, as can be understood from Table 1, when the polyolefin cross-linked substance was heated and pressurized with water at 190° C. for 5 hours, the resultant recycled samples (i.e., Example No. 8) did solve in ODCB completely. For instance, as set forth in Table 3, the recycled samples exhibited a gel fraction of 0%. Thus, it was found that water was less effective to break the cross-linking bonds than the other cross-linkage breaking agent, but could effect a cross-linkage breaking capability.

On the other hand, as can be appreciated from Table 1 (bis), when the polypropylene cross-linked substance was heated and pressurized at 150° C. for 3 hours with dodecane which was not a cross-linkage breaking agent, the resultant recycled samples (i.e., Comparative Example No. 9) did not solve in ODCB nor melted thermally. As recited in Table 1 (bis), when the polypropylene cross-linked substance was heated and pressurized under the same conditions without the cross-linkage breaking agents, the resultant recycled samples (i.e., Comparative Example No. 10) exhibited the identical results. Likewise, as can be seen from Table 1 (bis), the phenomena are the same even when the polypropylene cross-linked substance was heated and pressurized at 190° C. for 5 hours with dodecane (i.e., Comparative Example No. 11), or even when the polypropylene cross-linked substance was heated and pressurized under the same conditions without the cross-linkage breaking agents (i.e., Comparative Example No. 12). Thus, it was determined that the cross-linkage breaking hardly took place when the polypropylene cross-linked substance was simply heated and pressurized under the aforementioned conditions. Therefore, when a polyolefin cross-linked substance is processed by using a cross-linkage breaking agent in accordance with the present invention, the polyolefin cross-linked substance can be recycled into a moldable thermoplastic resin. cl Second Preferred Embodiment 100 parts by weight of a polypropylene resin, and 10 parts by weight of azodicarbonamide were melted and kneaded at 190° C. to prepare a sheet. The polypropylene resin exhibited a melt index of 0.5 g/10-min. The resulting sheet was foamed at 210° C. to a polypropylene foamed substance which exhibited an expansion ratio of 2. The thus prepared polypropylene foamed substance was free from a cross-linkage.

120 g of the cross-linkage-free polypropylene foamed substance, each 10 g of the following foaming-agent-decomposition facilitating agents, and 500 milliliters of toluene were sealed in a pressure-resistant container having a volume of 1 liter. The temperature inside the pressure-resistant container was elevated to 140° C. to heat and pressurize the contents thereof for 3 hours.

In Example No. 16, 1-methoxy-2-propanol was employed as the foaming-agent-decomposition facilitating agent. In Example No. 17, zinc acetate was employed as the foaming-agent-decomposition facilitating agent.

The following mixtures were tested as comparative examples. In Comparative Example No. 18, the mixture included dodecane instead of the foaming-agent-decomposition facilitating agents. In Comparative Example No. 19, no foaming-agent-decomposition facilitating agent was added.

After the cross-linkage-free polypropylene foamed substance was subjected to the facilitated foaming-agent decomposition, each of the resultant recycled samples was analyzed in terms of the content of the residual foaming agent in the following fashion. Each 100 g of the recycled samples were melted at 190° C. along with 100 g of a polypropylene resin to melt and mix, thereby preparing a blend. Each 10 g of the resulting blends was pressed to prepare a plate having a thickness of 1 mm. Each of the thus prepared plates was put on a griddle whose temperature was controlled at 260° C., and was held on the griddle for 30 minutes. Thereafter, each of the plates was inspected visually on the surface whether there arose foaming. The results of this visual inspection are set forth in Table 4 below.

TABLE 4

| Identification | | Foaming-Agent-Decomposition Facilitating Agent | Existence of Foaming due to Residual Foaming Agent | Evaluation* |
|---|---|---|---|---|
| 2nd Pref. Embodiment | Ex. No. 16 | 1-methoxy-2-propanol | Irregular Slightly | ○ |
| | Ex. No. 17 | Zinc Acetate | No Foaming | ◎ |
| Comp. Ex. | Comp. Ex. No. 18 | Dodecane | Many Irregularities | X |
| | Comp. Ex. No. 19 | None | Many Irregularities | X |

(Note)
*In evaluation, ◎ means "very good", ○ means "good", and X means "bad".

As summarized in Table 4, Comparative Example Nos. 18 and 19 were prepared by heating and pressurizing the cross-linkage-free polypropylene foamed substance without employing the foaming-agent-decomposition facilitating agents. When Comparative Example Nos. 18 and 19 were left at 260° C., many foams arose in the surface of Comparative Example Nos. 18 and 19.

On the other hand, Example No. 16 was prepared by heating and pressurizing the cross-linkage-free polypropylene foamed substance with the 1-methoxy-2-propanol working as the foaming-agent-decomposition facilitating agent. When Example No. 16 was left at 260° C., the surface of Example No. 16 was foamed slightly. Thus, the residues of the foaming agent were found to be sharply reduced by the 1-methoxy-2-propanol. Moreover, Example No. 17 was prepared by heating and pressurizing the cross-linkage-free polypropylene foamed substance with the lea acetate working as the foaming-agent-decomposition facilitating agent. When Example No. 17 was left at 260° C., no foaming was observed in the surface of Example No. 17.

Third Preferred Embodiment

FIG. 1 illustrates a schematic cross-sectional view of a laminate according to a Third Preferred Embodiment of the present recycling process. The laminate included a substrate, a cross-linked polypropylene foamed substance layer applied on the substrate, and a thermoplastic resin layer applied on the cross-linked polypropylene foamed substance layer. In the laminate, a foamed layer of a cross-linked polypropylene foamed substance and a top layer of a thermoplastic resin applied thereon were recycled in this embodiment. The cross-linked polypropylene foamed substance layer was formed of a cross-linked polypropylene foamed substance which exhibited an expansion ratio of 25 and had a thickness of 3 mm. The thermoplastic resin layer was formed of a polypropylene thermoplastic elastomer which was prepared by dynamically cross-linking a polypropylene and an ethylene-propylene diene copolymer elastomer.

Figure 3:
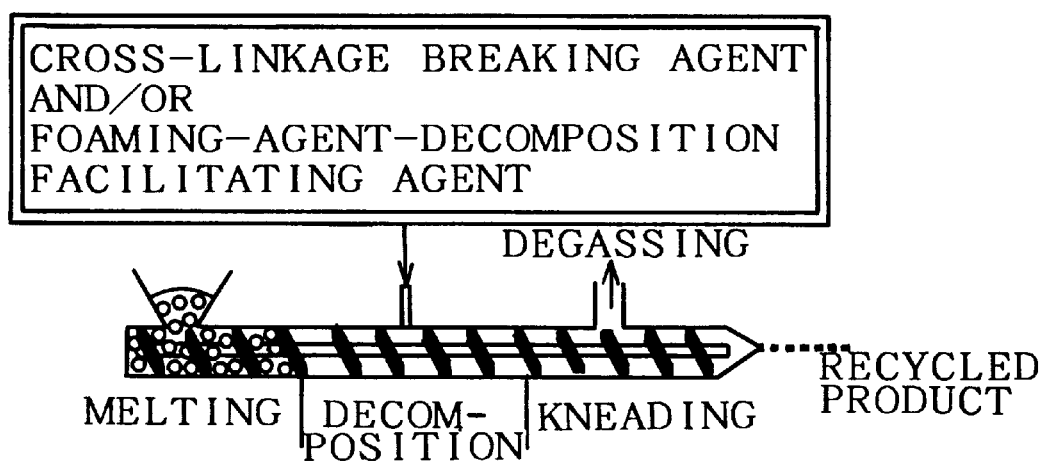
FIG. 3 illustrates a schematic cross-sectional view on a dual-axis extruder which was employed in Third, Fourth and Sixth Preferred Embodiments according to the present invention, and shows how a kneading operation was carried out therein.

The laminate was charged in a dual-axis extruder as illustrated in FIG. 3. Then, a cross-linkage breaking agent or a foaming-agent-decomposition facilitating agent was pressurized and fed in the dual-axis extruder while melting and kneading the laminate in the dual-axis extruder. Further, the resulting mixture was kneaded vigorously by applying a mechanical shear force. Thus, the cross-linkage breaking agent or the foaming-agent-decomposition facilitating agent was brought into contact with the cross-linked polypropylene foamed substance layer in order to facilitate the cross-linkage breaking reaction or the foaming-agent-decomposition reaction. Furthermore, the excessive cross-linkage breaking agent or the excessive foaming-agent-decomposition facilitating agent, and the decomposition products were degassed. Thereafter, the mixture was pelletized to prepare a recycled sample.

In Example No. 20, 1-methoxy-2-propanol was employed as the cross-linkage breaking agent. In Example No. 21, a 1% hydrochloric acid aqueous solution was employed as the cross-linkage breaking agent. Note that the 1-methoxy-2-propanol could also work as an foaming-agent-decomposition facilitating agent. In Example 22, zinc acetate was employed as the foaming-agent-decomposition facilitating agent.

The following example was tested as a comparative example. In Comparative Example No. 23, the laminate was melted and kneaded without adding the cross-linkage breaking agents and the foaming-agent-decomposition facilitating agents.

Each of the resultant recycled samples was examined for the melt index, the resinous physical properties, and the foaming state. Note that the melt index was measured by applying a load with a 10 kg weight which was heavier than the ordinary

TABLE 5

| Identification | Cross-Linkage Breaking Agent or Foaming-Agent-Decomposition Agent | Melt Index Measured with a 10 kg Weight at 230° C. (g/10-min.) | Tensile Strength (MPa) | Elongation at Fracture (%) | Foaming due to Residual Foaming Agent* |
|---|---|---|---|---|---|
| 3rd Pref. Embodiment | | | | | |
| Ex. No. 20 | 1-methoxy-2-propanol | 48 | 23.8 | 930 | ○ |
| Ex. No. 21 | 1% HCl aq. Solution | 50 | 24.0 | 925 | X |
| Ex. No. 22 | Zinc Acetate | 20 | 22.0 | 850 | ◎ |
| Comp. Ex. | | | | | |
| Comp. Ex. No. 23 | None | 18 | 20.4 | 810 | X |

(Note)
* ◎ means "no foaming", ○ means "irregular slightly", and X means "many irrgularities".

The following advantages of the Third Preferred Embodiment can be derived from Table 5:

1) when the cross-linkage breaking agents was added, the recycled samples were improved in terms of the melt index (or moldability), strengths and elongation; and 2) when the foaming-agent-decomposition facilitating agents were added, the recycled samples were improved in terms of the superficial appearance, for example, the surface roughness was improved, the foaming due to the residual foaming agent was suppressed, and so on.

Fourth Preferred Embodiment

In accordance with the Third Preferred Embodiment of the present recycling process, the cross-linkage breaking, and the foaming-agent decomposition were carried out simultaneously in the dual-axis extruder. Specifically, the cross-linkage breaking agent and the foaming-agent-decomposition facilitating agent were pressurized and fed in the dual-axis extruder at the same time. As a result, it was possible to prepare a recycled thermoplastic resinous raw material of moldable quality.

Fifth Preferred Embodiment 120 g of a polypropylene cross-linked substance, 10 g of a cross-linkage breaking agent, and 500 milliliters of toluene were sealed in a pressure-resistant container having a volume of 1 liter. The temperature inside the pressure-resistant container was elevated to a predetermined temperature to heat and pressurize the contents thereof for 10 hours.

In Example Nos. 24, 25, 26 and 27, the temperature inside the pressure-resistant container was elevated to 100° C., 150° C., 250° C. and 320° C., respectively. In all of Example Nos. 24, 25, 26 and 27, 1-methoxy-2-propanol was employed as the cross-linkage breaking agent.

After the heating-and-pressurizing treatment, each 0.1 g of the resultant recycled samples was put into 100 milliliters of ODCB. Then, the resulting mixtures were heated at 150° C. for 3 hours to evaluate the solubility and melt index of the recycled samples. The results of the evaluations are recited in Table 6 below. The melt index of the recycled samples was measured in accordance with ASTM D1238. Note that, as Comparative Example No. 28, a polypropylene resin, which was not turned into the polypropylene cross-linked substance by the cross-linking treatment, was also examined for the solubility and melt index.

Example No. 24 had been processed at 100° C. The resultant recycled samples did not solve in ODCB nor melted thermally. These phenomena are believed to have arisen as follows: the cross-linkage breaking agent operated at 100° C. so less that the cross-linkage breaking reaction did not full develop.

Example Nos. 25, 26 and 27 had been processed at 150° C., 250° C. and 320° C., respectively. The resultant recycled samples solved in ODCB, and were verified to have been subjected to the cross-linkage breaking. In particular, Example Nos. 25 and 26, which had been processed at 150° C. and 250° C., produced the recycled samples whose melt index was virtually identical with that of the polypropylene resin prior to the cross-linking treatment. Thus, in these recycled samples, no considerable molecular weight reduction occurred, molecular weight reduction which resulted from the thermal degradation of the polypropylene resin.

TABLE 6

| Identification | Cross-Linkage Breaking | Test Specimen | Recycling Temp. (° C.) | Solubility in ODCB | Melt Index (g/10-min.) |
| --- | --- | --- | --- | --- | --- |
| 5th Pref. Embodiment | | | | | |
| Ex. No. 24 | Done | Cross-linked Polypropylene | 100 | Swollen | Not Measurable |
| Ex. No. 25 | Done | Cross-linked Polypropylene | 150 | Soluble | 2.8 |
| Ex. No. 26 | Done | Cross-linked Polypropylene | 250 | Soluble | 3.2 |
| Ex. No. 27 | Done | Cross-linked Polypropylene | 320 | Soluble | >50 |
| Comp. Ex. | | | | | |
| Comp. Ex. No. 28 | None (w/o recycling) | PP free from Cross-Linkage (virgin material) | — | Soluble | 3.0 |

On the contrary, Example No. 27, which had been processed at 320° C., produced the recycled samples whose melt index was a couple of times or more as large as that of the polypropylene resin prior to the cross-linking treatment. This phenomenon are believed to have occurred as follows: there occurred the thermal degradation of the polypropylene resin which was accompanied by the cleavage of the main chains of the polypropylene resin, and eventually the molecular weight of the polypropylene was reduced sharply.

Thus, in view of the results described above, it is apparently important to carry out recycling at an optimum temperature in order to fully develop the cross-linkage breaking and to inhibit the thermal degradation. For instance, when the recycling is carried out by an autoclave (or a pressure-resistant container), it is preferred to process the substance to be recycled in a temperature range of from 150 to 250° C., further preferably from 200 to 250° C.

Sixth Preferred Embodiment

FIG. 1 also illustrates a schematic cross-sectional view of a laminate which was recycled by a Sixth Preferred Embodiment of the present recycling process. The laminate included a substrate, a cross-linked polypropylene foamed substance layer applied on the substrate, and a thermoplastic resin layer applied on the cross-linked polypropylene foamed substance layer. In the laminate, a foamed layer of cross-linked polypropylene foamed substance and a top layer of a thermoplastic resin applied thereon were recycled in this embodiment. The cross-linked polypropylene foamed substance layer was formed of a cross-linked polypropylene foamed substance which exhibited an expansion ratio of 25 and had a thickness of 3 mm. The thermoplastic resin layer was formed by a polypropylene thermoplastic elastomer which was prepared by dynamically cross-linking a polypropylene and an ethylene-propylene diene copolymer elastomer.

The laminate was charged in a dual-axis extruder as illustrated in FIG. 3. Then, 1-methoxy-2-propanol was pressurized and fed in the dual-axis extruder while melting and kneading the laminate in the dual-axis extruder. Note that, as earlier mentioned, the 1-methoxy-2-propanol worked not only as the cross-linkage breaking agent but also as the foaming-agent-decomposition facilitating agent. Further, the resulting mixture was kneaded vigorously by applying a mechanical shear force. Thus, the 1-methoxy-2-propanol was brought into contact with the cross-linked polypropylene foamed substance layer in order to facilitate the cross-linkage breaking reaction and the foaming-agent-decomposition reaction. Furthermore, the excessive 1-methoxy-2-propanol, and the decomposition products were degassed. Thereafter, the mixture was pelletized to prepare a recycled sample.

Note that, in the laminate recycled by the Sixth Preferred Embodiment of the present recycling process, the cross-linked polypropylene foamed substance layer occupied in a amount of about 25% by weight, and the thermoplastic resin layer occupied in an amount of 75% by weight. Consequently, the molten laminate exhibited a satisfactory plasticity without adding an extra thermoplastic resin to it.

were improved over Comparative Example No. 33, which was recycled free of the 1-methoxy-2-propanol, in terms of the melt index, and further exhibited the enlarged tensile strength and elongation. Thus, in Example Nos. 30 and 31, the 1-methoxy-2-propanol was determined to work as the cross-linkage breaking agent effectively. In addition, the recycled samples were found to be improved in terms of the foaming after the recycling. Specifically, the recycled samples were less likely to be foamed after the recycling. Thus, in the temperature range, the cross-linkage breaking and the residual foaming-agent decomposition were believed to develop effectively.

Example No. 32 had been processed at 320° C. The resultant recycled samples were less likely to be foamed by the residual foaming agent. However, the recycled samples exhibited the reduced tensile strength and elongation. This phenomenon are believed to have been caused by the thermal degradation of the polypropylene resin which was accompanied by the cleavage of the main chains of the polypropylene resin.

TABLE 7

| Identification | Recycling Temperature (° C.)* | Melt Index Measured with a 10 kg Weight at 230° C. (g/10 min.) | Tensile Strength (MPa) | Elongation at Fracture (%) | Foaming due to Residual Foaming Agent** |
|---|---|---|---|---|---|
| 6th Pref. Embodiment | | | | | |
| Ex. No. 29 | 180 | 17 | 20.6 | 820 | X |
| Ex. No. 30 | 230 | 48 | 23.8 | 930 | ○ |
| Ex. No. 31 | 260 | 60 | 24.2 | 940 | ○ |
| Ex. No. 32 | 320 | 100 | 15.0 | 210 | ○ |
| Comp. Ex. | | | | | |
| Comp. Ex. No. 33 | 230 (w/o 1-methoxy-2-propanol) | 18 | 20.4 | 810 | X |

(Note)
*In all of Example Nos. 29 through 32, 1-methoxy-2-propanol was added to the laminate.
**○ means "irregular slightly", and X means "many irregularities".

In Example No. 29, the laminate was recycled at 180° C. In Example No. 30, the laminate was recycled at 230° C. In Example No. 31, the laminate was recycled at 260° C. In Example No. 32, the laminate was recycled at 320° C. Note that the following example was tested as a comparative example. In Comparative Example No. 33, the laminate was recycled at 230° C. without adding the 1-methoxy-2-propanol. In all of Example Nos. 29 through 32 and Comparative Example No. 33, the laminates were processed for about 5 minutes.

Each of the resultant recycled samples was examined for the melt index, the resinous physical properties, and the foaming state. Note that the melt index was measured by applying a load with a 10 kg weight which was heavier than the ordinary weight. The results of the evaluations are summarized in Table 7 below.

Example No. 29 had been processed at 180° C. The resultant recycled samples exhibited properties similar to those exhibited by Comparative Example No. 33 which was recycled without adding the 1-methoxy-2-propanol to the laminate. Thus, in Example No. 29, the 1-methoxy-2-propanol was not found to effect the cross-linkage breaking and the residual foaming-agent-decomposition completely satisfactorily.

Example Nos. 30 and 31 had been processed at 230° C. and 250° C., respectively. The resultant recycled samples Thus, in order to properly carry out the cross-linkage breaking and/or residual foaming-agent decomposition, the inventors of the present invention found that it is necessary to recycle the laminate by melting, kneading and extruding in a temperature range of from 200 to 300° C., further preferably from 220 to 270° C.

Having now fully described the present invention, it will be apparent to one of ordinary skill in the art that many changes and modifications can be made thereto without departing from the spirit or scope of the present invention as set forth herein including the appended claims.

What is claimed is:

1. A process for recycling a polyolefin cross-linked substance having a cross-linkage which is at least one bond selected from the group consisting of an ester bond, an amide bond, a urea bond, a urethane bond, an ether bond, an acetal bond and a sulfone bond, the process comprising the step of:

heating a polyolefin cross-linked substance having a cross-linkage together with a cross-linkage breaking agent, whereby breaking the cross-linkage to recycle the polyolefin cross-linked substance into a moldable thermoplastic resin.

2. The recycling process according to claim 1, wherein the polyolefin cross-linked substance is formed of polypropylene.

3. The recycling process according to claim 1, wherein the heating step is carried out by heating the polyolefin cross-linked substance while bringing a liquid of the cross-linkage breaking agent into contact with the polyolefin cross-linked substance.

4. The recycling process according to claim 3, wherein said heating step is carried out under heat and pressure while pressurizing the polyolefin cross-linked substance in a pressure-resistant container.

5. The recycling process according to claim 4, wherein said heating step is carried out in a temperature range of from 150 to 250° C.

6. The recycling process according to claim 1, wherein said heating step is carried out by heating the polyolefin cross-linked substance while bringing a vapor of the cross-linkage breaking agent into contact with the polyolefin cross-linked substance.

7. The recycling process according to claim 1, wherein said heating step is carried out while adding a polyolefin resin in an amount of 10% by weight or more to the polyolefin cross-linked substance, the polyolefin resin including the same polyolefin as included in the polyolefin cross-linked substance and being free from a cross-linkage, and melting and kneading the resulting mixture in the presence of the cross-linkage breaking agent.

8. The recycling process according to claim 7, wherein said heating step is carried out in a temperature range of from 200 to 300° C.

9. The recycling process according to claim 1, wherein the cross-linkage includes at least one cross-linking bond selected from the group consisting of the ester bond, the amide bond, the urea bond and the urethane bond, and the cross-linkage breaking agent is at least one member selected from the group consisting of water, alcohol, amine, acid, alkali, Lewis acid and alkoxide.

10. The recycling process according to claim 9, wherein the alcohol is at least one member selected from the group consisting of a monohydric alcohol and a polyhydric alcohol.

11. The recycling process according to claim 9, wherein the amine is at least one member selected from the group consisting of a primary amine, a secondary amine, an alcoholic amine and a polyatomic amine.

12. The recycling process according to claim 9, wherein the acid is at least one member selected from the group consisting of an inorganic acid and an organic acid.

13. The recycling process according to claim 9, wherein the alkali is at least one member selected from the group consisting of an inorganic alkali and an organic base.

14. The recycling process according to claim 9, wherein the Lewis acid is at least one member selected from the group consisting of chloride or carboxylate salt.

15. The recycling process according to claim 9, wherein the alkoxide is at least one member selected from the group consisting of an alkaline-metallic alkoxide, an alkali-earth-metallic alkoxide and a metallic alkoxide.

16. The recycling process according to claim 1, wherein the cross-linkage is at least one cross-linking bond selected from the group consisting of the ether bond, the acetal bond and the sulfone bond, and the cross-linkage breaking agent is acid.

17. The recycling process according to claim 16, wherein the acid is at least one member selected from the group consisting of an inorganic acid and an organic acid.

18. A process for recycling a polyolefin foamed substance free from a cross-linkage, the process comprising the step of:

adding a foaming-agent-decomposition facilitating agent to a polyolefin foamed substance in the course of thermally melting the polyolefin foamed substance, whereby decomposing a residual foaming agent which is at least one organic foaming agent selected from the group consisting of azodicarbonamide, dinitro pentamethylene tetramine and p,p'-oxybisbenzensulfonylhydrazide remaining in the polyolefin foamed substance.

19. The recycling process according to claim 18, wherein the polyolefin foamed substance free from a cross-linkage is formed of polypropylene.

20. The recycling process according to claim 18, wherein, in said adding step, the polyolefin foamed substance is thermally melted by heating while bringing a liquid of the foaming-agent-decomposition facilitating agent into contact with the polyolefin foamed substance.

21. The recycling process according to claim 20, wherein, in said adding step, the polyolefin foamed substance is thermally melted by heating under heat and pressure in a pressure-resistant container.

22. The recycling process according to claim 21, wherein, in said heating step, the polyolefin foamed substance is thermally melted in a temperature range of from 150 to 250° C.

23. The recycling process according to claim 18, wherein, in said adding step, the polyolefin foamed substance is thermally melted by heating while bringing a vapor of the foaming-agent-decomposition facilitating agent into contact with the polyolefin foamed substance.

24. The recycling process according to claim 18, wherein, in said adding step, the polyolefin foamed substance is thermally melted and kneaded in the presence of the foaming-agent-decomposition facilitating agent and a polyolefin resin is added to the polyolefin foamed substance in an amount of 10% by weight or more, the polyolefin resin including the same polyolefin as included in the polyolefin foamed substance and being free from a cross-linkage.

25. The recycling process according to claim 24, wherein, in said heating step, the polyolefin foamed substance is thermally melted and kneaded in a temperature range of from 200 to 300° C.

26. The recycling process according to claim 18, wherein the foaming-agent-decomposition facilitating agent is at least one member selected from the group consisting of a metallic salt of a fatty acid, a metallic oxide, an alcohol, an amine and an organic salt.

27. The recycling process according to claim 26, wherein the metallic salt of a fatty acid is at least one member selected from the group consisting of a stearate and an acetate.

28. The recycling process according to claim 26, wherein the metallic oxide is at least one member selected from the group consisting of a lead oxide, a cadmium oxide, a zinc oxide, a calcium oxide and a magnesium oxide.

29. The recycling process according to claim 26, wherein the alcohol is at least one member selected from the group consisting of a monohydric alcohol and a polyhydric alcohol.

30. The recycling process according to claim 26, wherein the amine is at least one member selected from the group consisting of a primary amine, a secondary amine, an alcoholic amine and a polyatomic amine.

31. The recycling process according to claim 26, wherein the organic salt is a tine organic salt.

32. The recycling process according to claim 18 further comprising a step of degassing for removing a decomposition product.

33. A process for recycling a polyolefin foamed substance having a cross-linkage, the process comprising the step of:

adding a foaming-agent-decomposition facilitating agent to a polyolefin foamed substance in the course of heating a polyolefin foamed substance to break the cross-linkage, whereby decomposing a residual foaming agent which is at least one organic foaming agent selected from the group consisting of azodicarbonamide, dinitro pentamethylene tetramine and p,p'-oxybisbenzensulfonylhydrazide remaining in the polyolefin foamed substance.

34. The recycling process according to claim 33, wherein the polyolefin foamed substance is formed of polypropylene.

35. The recycling process according to claim 33, wherein, in said adding step, the polyolefin foamed substance is heated while bringing a liquid of the foaming-agent-decomposition facilitating agent into contact with the polyolefin foamed substance.

36. The recycling process according to claim 35, wherein, in said adding step, the polyolefin foamed substance is heated under heat and pressure in a pressure-resistant container.

37. The recycling process according to claim 35, wherein, in said heating step, the polyolefin foamed substance is thermally melted in a temperature range of from 150 to 250° C.

38. The recycling process according to claim 33, wherein, in said adding step, the polyolefin foamed substance is heated while bringing a vapor of the foaming-agent-decomposition facilitating agent into contact with the polyolefin foamed substance.

39. The recycling process according to claim 33, wherein, in said adding step, the polyolefin foamed substance is thermally melted and kneaded by heating and a polyolefin resin is added to the polyolefin foamed substance in an amount of 10% by weight or more, the polyolefin resin including the same polyolefin as included in the polyolefin foamed substance and being free from a cross-linkage.

40. The recycling process according to claim 39, wherein, in said heating step, the polyolefin foamed substance is thermally melted and kneaded in a temperature range of from 200 to 300° C.

41. The recycling process according to claim 33, wherein the foaming-agent-decomposition facilitating agent is at least one member selected from the group consisting of a metallic salt of a fatty acid, a metallic oxide, an alcohol, an amine and an organic salt.

42. The recycling process according to claim 41, wherein the metallic salt of a fatty acid is at least one member selected from the group consisting of a stearate and an acetate.

43. The recycling process according to claim 41, wherein the metallic oxide is at least one member selected from the group consisting of a lead oxide, a cadmium oxide, a zinc oxide, a calcium oxide and a magnesium oxide.

44. The recycling process according to claim 41, wherein the alcohol is at least one member selected from the group consisting of a monohydric alcohol and a polyhydric alcohol.

45. The recycling process according to claim 41, wherein the amine is at least one member selected from the group consisting of a primary amine, a secondary amine, an alcoholic amine and a polyatomic amine.

46. The recycling process according to claim 41, wherein the organic salt is a tin organic salt.

47. The recycling process according to claim 33 further comprising a step of degassing for removing a decomposition product.

* * * * *

UNITED STATES PATENT AND TRADEMARK OFFICE
CERTIFICATE OF CORRECTION

PATENT NO. : 6,090,862
DATED : July 18, 2000
INVENTOR(S) : N. TATSUDA, et al.

It is certified that error appears in the above-indentified patent and that said Letters Patent is hereby corrected as shown below:

The following additional Assignee is added:
[73] Assignee: Kabushiki Kaisha Toyota Chuo Kenkyusho, Aichi, Japan In Claim 31, line 2 "tine" is changed to --tin--.

Signed and Sealed this

First Day of May, 2001

Attest:

NICHOLAS P. GODICI

*Attesting Officer*   *Acting Director of the United States Patent and Trademark Office*